W. GILMAN.
Wheel Cultivator.

No. 107,357.  Patented Sept. 13, 1870.

Witnesses,
J. H. Hester
H. A. Daniels

W. Gilman by Attorney
Ch. Sidney Whitman
Washington D.C.

United States Patent Office.

WILLIAM GILMAN, OF OTTAWA, ILLINOIS.

Letters Patent No. 107,357, dated September 13, 1870.

IMPROVEMENT IN CORN-CULTIVATORS.

The Schedule referred to in these Letters Patent and making part of the same.

To all whom it may concern:

Be it known that I, WILLIAM GILMAN, of Ottawa, in the county of La Salle and in the State of Illinois, have invented a new and useful Improvement in Cultivator-Plows; and do hereby declare that the following description, taken in connection with the accompanying drawing hereinafter referred to, forms a full and exact specification of the same, wherein I have set forth the nature and principles of my said improvement, by which my invention may be distinguished from others of a similar class, together with such parts as I claim and desire to secure by Letters Patent.

My invention relates to that class of implements used for loosening and pulverizing the soil, and cutting and destroying weeds, termed double cultivator-plows; and the nature thereof consists in rendering the axle, to which the gangs are attached, capable of vertical adjustment, for the purpose of regulating the depth of the furrows cut by the shares; in combining the cross-bar, to which the gangs and tongue are attached, with the axles, upon which the wheels rotate, by means of a flange, rigidly attached to the cross-bar, and forming a bearing for the axles, in such a manner as to utilize the reactive force or pressure of the earth upon the shares, for the purpose of lifting the tongue, and sustaining it in a horizontal position, as hereinafter shown and described.

In the accompanying drawing which illustrates my invention, and forms a part of the specification thereof, in which corresponding parts are illustrated by similar letters—

Figure 1:
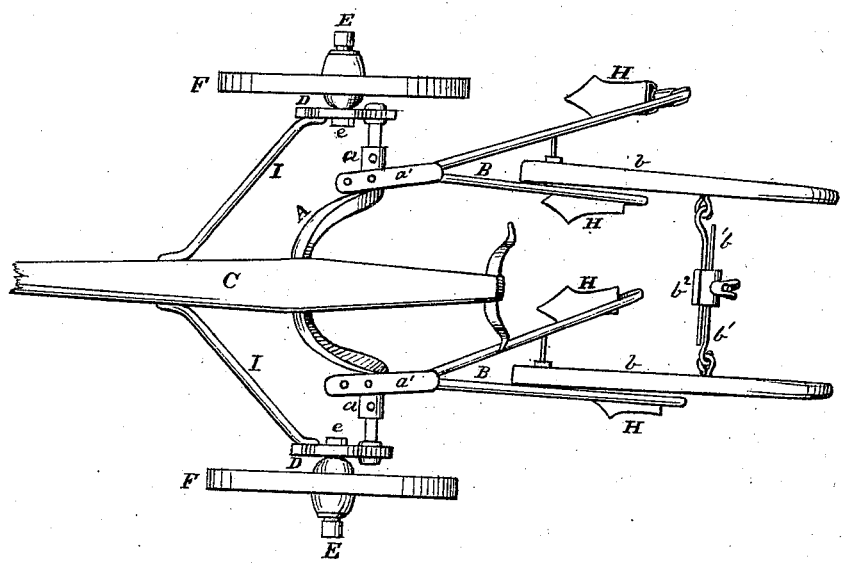
Figure 2:
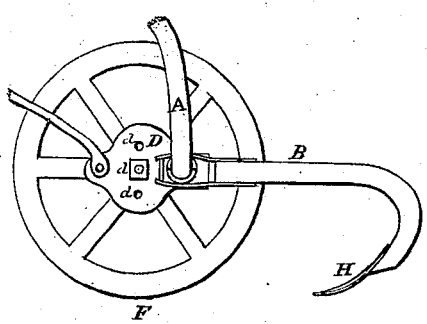

Figure 1 is a top view of a double cultivator-plow, with my invention applied thereto, and Figure 2 is a view in detail.

The construction, operation, and relative arrangement of the component parts of my invention, and the implement to which it is attached, are as follows, to wit:

A designates the cross-bar, the middle part of which is curved upward, and rigidly attached to the tongue C.

Upon the said cross-bar are the sleeves $a\ a$, provided each with pins, to which are secured, by means of the clevises $a'\ a'$, the curved bars of the gangs B, in such a manner as to render the said gangs capable of lateral adjustment, and to allow them to vibrate independently of each other.

To the said curved bars are attached the handles $b\ b$, which are connected together, expanded, or contracted by means of the rods $b^1$ and clamp $b^2$.

To the ends of the cross-bar A are attached the flanges D, provided with the apertures or slots $d$.

The axles E, upon which rotate the wheels F, pass through one of the apertures $d$, and are secured in position by the nut $e$.

By means of the apertures in the said flanges, the cross-bar A, to which are attached, as aforesaid, the curvilinear bars of the gangs, is depressed or raised, and the depth of the furrow cut by the shares regulated.

The reactive force exerted against the shares H, in passing through the ground, resolves itself into a backward and downward pressure upon the bar A, which, with the said flanges and braces I, acts as a lever, the fulcrum of which is the axles E, and causes the draft-pole to assume and maintain a horizontal position.

Another advantage in using the short axles E, as aforesaid, in preference to those heretofore in use, is that, when they become worn out by friction, they may be replaced with the greatest ease and convenience.

Having thus described the construction and application of my invention, I will designate what I claim and desire to secure by Letters Patent in the following:

The arrangement of the cross-bar A, gangs B, flanges D, axle E, brace I, and tongue C, when constructed and operating together as described.

In testimony that I claim the foregoing, I have hereunto set my hand, this 26th day of February, 1870.

WM. GILMAN.

Witnesses:
J. WHITMAN,
J. W. MESTER.